CIRCUIT ARRANGEMENT FOR THE COMMON AMPLIFICATION OF THE VIDEO-SIGNAL AND THE I.F. AUDIO-SIGNAL IN TELEVISION RECEIVERS

Filed April 30, 1964

INVENTOR.
ENGELMUNDUS J. HOEFGEEST
BY
AGENT 3,352,964

CIRCUIT ARRANGEMENT FOR THE COMMON AMPLIFICATION OF THE VIDEO-SIGNAL AND THE I.F. AUDIO-SIGNAL IN TELEVISION RECEIVERS

Engelmundus Johannes Hoefgeest, Emmasingel, Eindhoven, Netherlands, assignor to North American Philips Company, Inc., New York, N.Y., a corporation of Delaware Filed Apr. 30, 1964, Ser. No. 363,848
Claims priority, application Netherlands, May 15, 1963, 292,832
9 Claims. (Cl. 178—5.8)

ABSTRACT OF THE DISCLOSURE

A transistor amplifier for television video and audio intermediate frequency signals has two stages. The first stage is connected as a common collector amplifier for video signals and a common emitter amplifier for audio intermediate frequency signals. The base of the second stage is coupled to the emitter and collector of the first stage. The second stage is connected as a common emitter amplifier for video and sound intermediate frequency signals.

Figure 1:
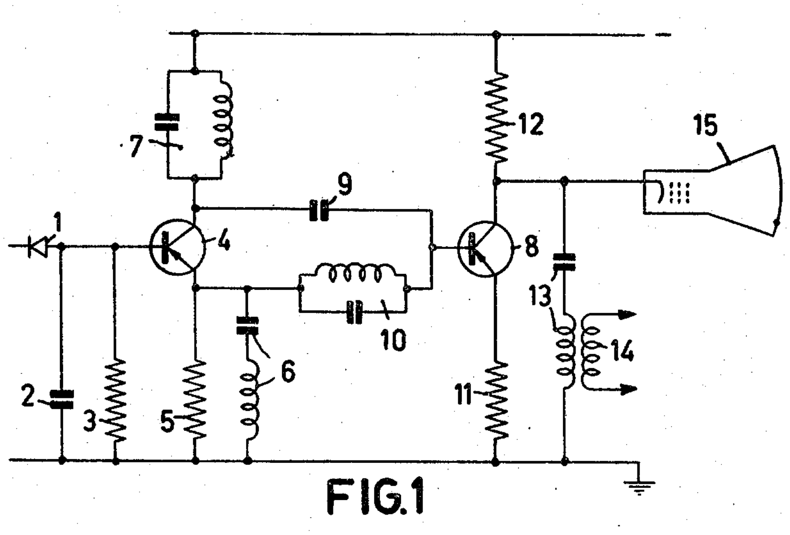

This invention relates to circuit arrangements for the common amplification of the video-signal and I.F. audio-signal in television receivers wherein a first transistor is operated in common collector arrangement for the video-signal and in common emitter arrangement for the I.F. audio-signal and wherein the video-signal derived from the emitter circuit of the first transistor is applied to the base of a second transistor operated in common emitter arrangement.

In a transistorized television receiver the video-output transistor, which serves to give the video-signal the voltage amplification required for the control of the display tube, is usually preceded by a transistor in grounded collector arrangement (emitter follower). Such a transistor serves, on the one hand, to reduce the load on the video-detector and, on the other hand, to permit voltage control of the output stage. Thus the influence of the internal feedback capacitance of the output transistor on the bandwidth of the video-amplifier is substantially eliminated.

In such transistorized television receivers a simplification and a saving of cost may be obtained by using the video-preamplifier, which fulfills the function of an emitter follower for the video-signal, at the same time as an amplifier stage for the I.F. audio-signal. Since the video-preamplifier must provide a high voltage amplification for the audio-signal the stage is operated in common emitter circuit for the I.F. audio-signal. The use of this transistor for both video-amplification and I.F. amplification may be realized in a simple manner especially when using the so-called inter-carrier system in which the video-detector connected to the base of the video-preamplifier also supplies the I.F. audio-signal.

Although a considerable simplification of the television receiver is obtained in the manner above described, the I.F. audio-signal amplified in the video-preamplifier has an amplitude which is still insufficient for the signal to be applied directly to the audio-detector of the receiver, so that it is necessary to include at least one additional amplifying stage for the said signal. It is an object of the invention to provide a circuit arrangement with which a further simplification of the television receiver is obtained. To this end, a circuit arrangement according to the invention is characterized in that the I.F. audio-signal from the collector circuit of the first transistor is applied to the base of the second transistor and that the second transistor is operated in common emitter arrangement for the I.F. audio signal.

The invention underlies recognition of the fact that in transistorized television receivers it is possible to use the video-output transistor as a second (and thus often also as a final) amplifying stage for the I.F. audio-signal and that it is possible to avoid impermissible intermodulation distortion between the video-signal and the audio-signal in the said transistor despite the great I.F. audio-signal applied to the video-output transistor.

Figure 2:
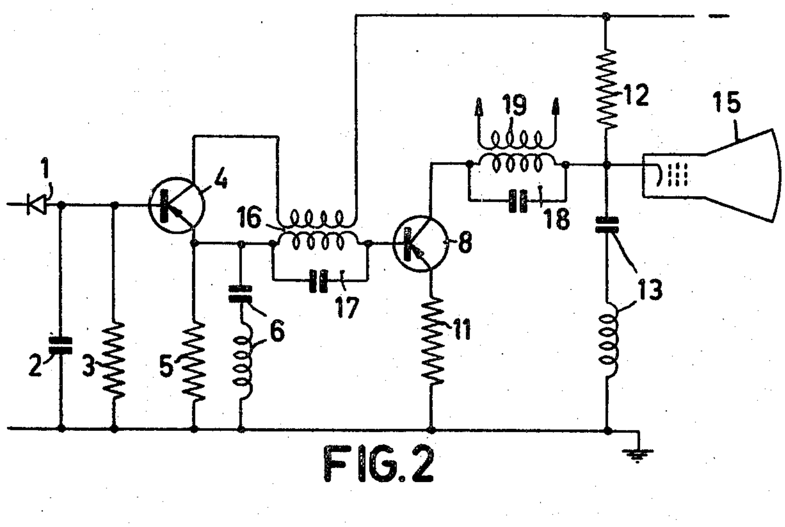

In order that the invention may be readily carried into effect, it will now be described in detail, by way of example, with reference to the accompanying diagrammatic drawing, in which:

FIGURE 1 shows a first embodiment of a circuit arrangement according to the invention and FIGURE 2 shows a second embodiment thereof.

FIGURE 1 shows a diode 1, a capacitor 2 and a resistor 3 which form part of the video-detector circuit in a transistorized television receiver operating in accordance with the intercarrier system. This detector circuit has applied to it a video-signal modulated on a carrier wave of, for example, 38.9 mc./s., together with an audio-signal modulated on an auxiliary audio carrier of, for example, 33.4 mc./s. Due to the detecting action of the diode 1, the demodulated video-signal (0 to 5 mc./s.) appears across the detector resistor 3 and, due to mixing of the 38.9 mc./s. and the 33.4 mc./s. carrier waves, an I.F. audio-carrier of 5.5 mc./s. which is modulated by the audio-signal. The higher frequencies occurring in the detector circuit are short-circuited by the capacitor 2.

The video-signal and the I.F. audio-signal of 5.5 mc./s. are both applied to the base of a transistor 4. The emitter circuit of transistor 4 includes a resistor 5 and, parallel to this resistor, a series-resonant circuit 6 which is tuned to the frequency of the I.F. audio-signal. The collector circuit of transistor 4 includes a parallel resonant circuit 7 which is likewise tuned to the I.F. audio-signal.

The circuit arrangement of FIGURE 1 also comprises a second transistor 8 the base of which is connected through a small capacitor 9 to the collector of transistor 4 and through a parallel resonant circuit 10, tuned to the I.F. audio-signal, to the emitter of transistor 4. The emitter circuit of transistor 8 includes a non-bypassed emitter resistor 11 and its collector circuit includes a collector resistor 12, together with a series-resonant circuit 13, connected parallel to the collector resistor for alternating voltages, which is tuned to the I.F. audio-signal. The I.F. audio-signal is available across an output winding 14 which is magnetically coupled to the inductance of the resonant circuit 13, whilst the video-signal set up across resistor 12 is applied directly to the cathode of a television display tube indicated by 15.

The circuit arrangement shown in FIGURE 1 operates as follows:

The parallel resonant circuit 7 included in the collector circuit of transistor 4 has a low impedance for the video-signal (0 to 5 mc./s.) whereas the series-resonant circuit 6 connected parallel to the emitter resistor 5 constitutes a high impedance relative to the resistor 5. The transistor 4 is thus active as an emitter follower for the video-signal derived from the emitter. The video-signal is applied to the base of transistor 8 through the resonant circuit 10 which has a low impedance for the said signal. The transistor 4, which is active as an emitter follower, has for its purpose to permit satisfactory voltage control of transistor 8 and also to prevent the video-detector from being unduly loaded.

The video-signal is subsequently amplified by transistor 8 and the amplified video-signal set up across the collector resistor 12 is applied to the cathode of the display tube 15. The resonant circuit 13, connected parallel to the resistor 12 for alternating voltages, has for the frequencies of the video-signal so high an impedance relative to the resistor 12 that the resonant circuit 13 does not bring about any appreciable distortion of the frequency curve.

The transistor 4 has a high collector impedance (the resonant circuit 7) for the I.F. audio-signal (5.5 mc./s.) and furthermore negative current feedback through the resistor 5 is avoided for the said signal by the series-resonant circuit 6 which constitutes a short-circuit across the resistor 5. The two resonant circuits 6 and 7 thus result in the transistor 4 fulfilling the function of an amplifier stage in common emitter arrangement of very high voltage amplification for the I.F. audio-signal derived from the collector. The amplified I.F. audio-signal is applied through capacitor 9 to the base of transistor 8. The resonant circuit 10 serves to prevent this I.F. audio-signal from being short circuited to earth through the circuit 6. The I.F. audio-signal is subsequently further amplified by transistor 8 which operates in common emitter arrangement.

In the above-described manner it is ensured that the transistor 8 which serves as an output amplifier for the video-signal, also acts as a second I.F. audio-amplifier so that a separate I.F. audio-amplifier stage can be saved. The resonant circuit 13 included in the collector circuit of transistor 8 has two functions: firstly, the said circuit constitutes a short-circuit for the I.F. audio-signal, which is included between the cathode of the display tube 15 and earth, so that the audio-signal cannot interfere with the image display and, secondly, the great 5.5 mc./s. short-circuiting current which flows through the circuit 13 causes a high voltage across the winding 14 coupled to the inductance of the circuit 13. The I.F. audio-signal may thus be derived from the said winding with a great amplitude.

A second embodiment of a circuit according to the invention is shown in FIGURE 2. Circuit elements corresponding to those of FIGURE 1 are indicated by the same reference numerals in FIGURE 2.

In this embodiment the coupling for the I.F. audio-signal between the transistor 4 and the transistor 8 is established by means of a transformer 16 the primary winding of which is included in the collector circuit of transistor 4 and the secondary winding of which is included in the base lead of transistor 8. The secondary winding is tuned to the I.F. audio-signal by means of a capacitor 17. A simple circuit is thus obtained in which the correct coupling is established for both the video-signal and the I.F. audio-signal. The secondary winding of transformer 16 has a low impedance for the frequencies of the video-signal so that a direct connection exists for the video-signal between the emitter of transistor 4 and the base of transistor 8. However, the impedance between the emitter of transistor 4 and the base of transistor 8 is high for the I.F. audio-signal since the secondary winding, together with the capacitor 17, is in resonance for the signal. The coupling of the I.F. audio-signal, which is brought about by means of capacitor 9 in the embodiment of FIGURE 1, is effected in FIGURE 2 by means of the magnetic coupling between the primary and secondary windings of transformer 16, whilst the high impedance required in the collector circuit of transistor 4 for the I.F. audio-signal is constituted in the embodiment of FIGURE 2, by the resonant circuit on the secondary side of the transformer 16, which impedance transformed, is also active on the primary side. It is naturally also possible for the primary winding instead of the secondary winding of the transformer, or for both the secondary and primary windings to be tuned to the I.F. audio-signal.

To prevent the I.F. audio-signal from reaching the cathode of the display tube 15, the arrangement of FIGURE 2 includes not only a series-resonant circuit 13, which short-circuits the collector resistor 12 for the I.F. audio-signal, but also a parallel resonant circuit 18 which is tuned to the said signal. The circuit 18 is included between the collector of transistor 8 and the cathode of display tube 15 and serves as an isolating circuit for the I.F. audio-signal. The video-signal can then pass unhindered through the circuit 18. A very satisfactory suppression of the audio-signal at the display tube is thus obtained; an output winding 19 for the I.F. audio-signal is preferably magnetically coupled to the inductance of the resonant circuit 18.

Several methods have been described with reference to FIGURES 1 and 2 according to which the video-amplifier of a transistorized television receiver may also be used as an I.F. audio amplifier. In the arrangements according to the invention the amplification of the I.F. audio-signal is such that additional I.F. audio-amplifier stages are usually not necessary. The audio-detector of the television receiver may then be connected directly to the outcoupling windings 14 and 19 respectively shown in FIGURES 1 and 2. Besides, in the circuit arrangements according to the invention, the amplification reserve for the video-signal is such that a non-bypassed emitter resistor 11 of considerable value (for example 200 ohms) can be included in the emitter circuit of transistor 8. This is very important since both the video-signal and the I.F. audio-signal are applied to the transistor 8 with great amplitudes so that a risk of intermodulation distortion of the video- and audio-signals is involved. The non-bypassed emitter resistor 11 has so great a linearising influence on the amplifying properties of the final amplifier stage that intermodulation distortion may be maintained within the limits prescribed.

Since the television video-signal contains a direct voltage component which constitutes an essential component of the said signal, the video-amplifier must also be active as a D.C. amplifier. Closer consideration of FIGURES 1 and 2 shows that this condition is fulfilled in arrangements in accordance with the invention.

What is claimed is:

1. A television circuit for the common amplification of a video signal and an intermediate frequency audio signal, comprising a source of said signals, first and second transistors, means coupling said signals to the base of said first transistor, impedance means connected to the collector and emitter of said first transistor, said impedance means having a frequency response whereby said first transistor operates as a common collector amplifier for said video signal and a common emitter amplifier for said intermediate frequency audio signal, means coupling the intermediate frequency signal from said collector of said first transistor and the video signal from the emitter of said first transistor to the base of said second transistor, and output circuit means connected to the collector of said second transistor whereby said second transistor operates as a common emitter amplifier for said video and intermediate frequency signals.

2. A television circuit for the common amplification of a video signal and an intermediate frequency audio signal, comprising a source of said signals, first and second transistors, means coupling said signals to the base of said first transistor, a collector circuit connected to the collector of said first transistor comprising a parallel resonant circuit tuned to said intermediate frequency signal whereby said first transistor operates as a common emitter amplifier for said intermediate frequency signal, impedance means connected to the emitter of said first transistor having a frequency response whereby said first transistor operates as a common collector amplifier for said video signals, means coupling the intermediate frequency signal from said collector of said first transistor and the video signal from the emitter of said first transistor to the base of said second transistor, and output circuit means connected to the collector of said second transistor whereby said second transistor operates as a common emitter amplifier for said video and intermediate frequency signals.

3. A television circuit for the common amplification of a video signal and an intermediate frequency audio signal, comprising a source of said signals, first and second transistors, means coupling said signals to the base of said first transistor, a first parallel resonant circuit tuned to said intermediate frequency signal and connected to the collector of said first transistor whereby said first transistor operates as a common emitter amplifier for said intermediate frequency signals, means connecting the collector of said first transistor to the base of said second transistor, impedance means connected to the emitter of said first transistor and having a frequency response so that said first transistor operates as a common collector amplifier for said video signal, a second parallel resonant circuit tuned to said intermediate frequency signal, means connecting said second parallel resonant circuit between the emitter of said first transistor and the base of said second transistor, and output circuit means connected to the collector of said second transistor whereby said second transistor operates as a common emitter amplifier for said video and intermediate frequency signals.

4. The circuit of claim 4, in which said impedance means comprises a series resonant circuit tuned to said intermediate frequency signals.

5. A television circuit for the common amplification of a video signal and an intermediate frequency audio signal, comprising a source of said signals, first and second transistors, means coupling said signals to the base of said first transistor, a source of operating voltage having first and second terminals, first and second parallel resonant circuits tuned to said intermediate frequency signal, means connecting said first circuit between the collector of said first transistor and said first terminal, means connecting said collector of said first transistor to the base of said second transistor, means connecting said second circuit between the emitter of said first transistor and the base of said second transistor, impedance means and a series resonant circuit tuned to said intermediate frequency signal connected in parallel between the emitter of said first transistor and said second terminal, and output circuit means connected to the collector of said second transistor whereby said second transistor operates as a common emitter amplifier for said video and intermediate frequency signals.

6. A television circuit for the common amplification of a video signal and an intermediate frequency audio signal, comprising a source of said signals, first and second transistors, means coupling said signals to the base of said first transistor, a transformer having a primary winding connected between the collector of said first transistor and a point of operating potential, and a secondary winding connected between the emitter of said first transistor and the base of said second transistor, capacitor means connected in parallel with said secondary winding whereby said secondary winding and capacitor means are resonant at the frequency of said intermediate frequency signal, series resonant means tuned to said frequency and connected to the emitter of said first transistor whereby said first transistor operates as a common emitter amplifier for said intermediate frequency signal and as a common collector amplifier for said video signal, and output circuit means connected to the collector of said second transistor whereby said second transistor operates as a common emitter amplifier for said video and intermediate frequency signals.

7. A television receiver comprising a source of a video signal and a sound signal modulated on a subcarrier wave, an image reproducing device, first and second transistors, means connecting said source to the base of said first transistor, first and second impedance means connected to the collector and emitter of said first transistor, said first and second impedance means having low and high impedances respectively at signals of the frequency of said video signal whereby said first transistor operates as a common collector amplifier for said video signals, said first and second impedance means having high and low impedances respectively to signals of the frequency of said subcarrier wave, whereby said first transistor operates as a common emitter amplifier for said sound signal, means for coupling signals at the emitter and collector of said first transistor to the base of said second transistor, output circuit means connected to the collector of the second transistor whereby said second transistor operates as a common emitter amplifier for said video and sound signals, sound output means, and means connected to said output circuit means for coupling said sound signals modulated on said subcarrier wave to said sound output means and for applying said video signals to said reproducing device.

8. The receiver of claim 7, in which said output circuit means comprises parallel resonant circuit means tuned to the frequency of said subcarrier wave and connected between said collector of said second transistor and said reproducing device, said resonant circuit means having a coil, means inductively coupling said coil to said sound output means, and series resonant circuit means tuned to said frequency and connected to said reproducing device for preventing application of said subcarrier wave to said reproducing device.

9. The receiver of claim 7, in which said output circuit means comprises means connecting said collector of said second transistor to said reproducing device, a series resonant circuit tuned to the frequency of said subcarrier wave and connected to said collector of said second transistor, said series resonant circuit having a coil, and means for inductively coupling said coil to said sound output means.

References Cited

UNITED STATES PATENTS

| | | | |
|---|---|---|---|
| 3,091,659 | 5/1963 | Massman | 178—5.8 |

JOHN W. CALDWELL, *Primary Examiner.*

R. L. RICHARDSON, *Assistant Examiner.*